United States Patent [19]

Narasimhalu et al.

[11] Patent Number: 5,499,298
[45] Date of Patent: Mar. 12, 1996

[54] CONTROLLED DISSEMINATION OF DIGITAL INFORMATION

[75] Inventors: Arcot D. Narasimhalu; Weiguo Wang; Mohan S. Kankanhalli, all of Singapore, Singapore

[73] Assignee: National University of Singapore, Singapore

[21] Appl. No.: 210,174

[22] Filed: Mar. 17, 1994

[51] Int. Cl.$^6$ .................................................. H04L 9/00
[52] U.S. Cl. .............................. 380/25; 380/9; 380/21; 380/23; 380/30; 380/49
[58] Field of Search .................. 380/4, 9, 21, 23, 380/25, 43, 49, 50, 30

[56] References Cited

U.S. PATENT DOCUMENTS

| | | | |
|---|---|---|---|
| 4,866,769 | 9/1989 | Karp | 380/4 |
| 4,868,866 | 9/1989 | Williams, Jr. | 380/49 |
| 4,903,296 | 2/1990 | Chandra et al. | 380/4 |
| 4,999,806 | 3/1991 | Chernow et al. | 395/700 |

*Primary Examiner*—Bernarr E. Gregory
*Attorney, Agent, or Firm*—Lawrence Y. D. Ho

[57] ABSTRACT

The present invention is a method and apparatus for controlling the dissemination of digital information. Digital information is structured logically to incorporate usage history and allowable access window before it is encrypted in a header portion and a body portion. The end user accesses the digital information with a tamper-proof controlled information access device by decrypting the digital information. A controller disposed in the controlled information access device permits end users to access transparently uncontrolled information. Controlled digital information will be accessed as long as the conditions specified by the information provider are met. In one embodiment of the present invention, controlled information is disseminated in an off-line manner while the second embodiment of the present invention disseminates controlled digital information in an on-line manner.

13 Claims, 12 Drawing Sheets

Access Device

CONTROLLED DISSEMINATION OF DIGITAL INFORMATION

BACKGROUND OF THE INVENTION

1. Field of the Invention

The present invention relates to the field of data processing, and in particular, to a method and apparatus for controlling the dissemination of digital information. Furthermore, the present invention provides transparent access to uncontrolled digital information together with controlled digital information with the same access apparatus.

2. Description of the Related Art

The distribution of original works—whether be it text, graphics, animation, video or audio—in magnetic, electronic, optical or any other medium is becoming popular. Advances in digital compression technology and improvement in the price/performance ratio of computers have made it economical and feasible to disseminate digital information in such "soft" forms. However, original works encoded in digital medium can be easily duplicated, encrypted, transmitted via communication networks and destroyed. For the remainder of the description of the present invention, original works encoded in digital medium shall be referred to as digital information. The push factors, i.e., easy access and manipulation, that make digital information a rival to the traditional hard copy forms, i.e., books, newspapers or microfiches, have also made it difficult to establish evidence of illegal usage of such information.

With respect to the distribution of hard copies of original works, copyright and publishing laws strike a balance between the twin goals of compensating the publisher/author and of maintaining reasonable cost to the end users. It is straightforward to establish evidence of making illegal copies of hard copy of original works. The main thrust of copyright and publishing laws is to establish evidence of illegal possession.

In contrast, evidence of illegal possession of digital information is difficult at best and at worst impossible to obtain. The present invention proposes to control the usage of distributed digital information as an alternative. By usage, the present invention refers to the number and timing of the accesses specified by the information provider.

Prior art controls the dissemination of software programs only with copy protection schemes. Copy protection relies on hardware or software artifacts to detect and prevent illegal copying of software programs. Encryption is sometimes used to provide copy protection. Some recent examples of copy protection schemes are U.S. Pat. No. 4,866,769 to Karp and U.S. Pat. No. 4,903,296 to Chandra et al.

U.S. Pat. No. 4,903,296 claims copy protection of software on magnetic medium with a special key having two marks made on the surface of the medium. These marks are in the form of absence of material and domains that cannot be formed by conventional magnetic disk write heads. Additionally, an encrypted key which is critical for running the application is built into a special purpose hardware subsystem. Finally the hardware subsystem is required to decrypt the key.

U.S. Pat. No. 4,866,769 teaches a method of copy protection of personal computer software distributed in diskettes through the use of a unique identification stored in read only memory of a personal computer. A source ID is provided with every software distributed. The personal computer ID is used with the source ID on the distribution diskette to produce an encoded check word, using any available encryption method. This check word is then used to verify that the software is being used on the designated personal computer.

While U.S. Pat. Nos. 4,903,296 and 4,866,769 disclose off-line schemes for controlled dissemination of software, U.S. Pat. No. 4,999,806 describes a central station distributing software over telephone lines—an on-line scheme for software dissemination. The central station transmits an acceptance code to a caller and then terminates the call. After verifying the caller's credit information, the central station calls the purchaser back and continues with the transaction only after receiving the acceptance code. The central station then transmits a Control Transfer Program and Initialization Program to the purchaser. The purchaser executes the Initialization Program to turn over control of the purchaser's computer to the central station. The Control Transfer Program makes sure that no memory resident copying programs are running before transmitting over the telephone line the purchased/leased program to the purchaser's computer. Thereafter the various transmitted programs are erased, leaving only a copy of protected version of the purchased program on the purchaser's disk.

To prevent unauthorized copying and use of information, prior art copy protection schemes require either introducing artificial indica as software keys or requiring special hardware subsystems. Not only are these solutions costly to both the information providers and the end users as they require additional processing steps, but they are also incompatible with the trend of encouraging concurrent use of different types of information in a network environment. Furthermore, the prior art copy protection schemes provide limited control over the dissemination of digital information in that they prevent unauthorized copying of software but not "uses" of such information.

Absent from the prior art is the dissemination of uncontrolled information. By uncontrolled information, the present invention refers to a portion of the information which the information provider has decided to let the end user view without registering it as a "use" of the controlled information. Typically, the uncontrolled information is either at a lower resolution compared with the controlled information or it comprises a selected portion of the controlled information which allows the end user to make an informed decision whether to subscribe or use the controlled information. Examples of uncontrolled information are the preview of a movie, or a demonstration version of the controlled software, or even an abstract of a patent document. Hitherto, prior art information dissemination system does not permit the transparent access of uncontrolled digital information with the same access device as that for accessing the controlled digital information.

SUMMARY OF THE INVENTION

The present invention is a method and apparatus for controlling the dissemination of digital information. Digital information is structured logically to incorporate usage history and allowable access window before it is encrypted in a header portion and a body portion. The end user accesses the digital information with a tamper-proof controlled information access device by decrypting the digital information. A controller disposed in the controlled information access device permits end users to access transparently uncontrolled information. Controlled digital information will be accessed as long as the conditions specified by the information provider are met. In one embodiment of the present invention, controlled information is disseminated in an off-line manner while the second embodiment of the present invention disseminates controlled digital information in an on-line manner.

DETAILED DESCRIPTION OF THE INVENTION

A method and apparatus for controlling the dissemination of digital information is described. In the following description, numerous specific details are set forth such as logical structures of digital information and program steps, etc. in order to provide a thorough understanding of the present invention. It will be obvious to one skilled in the art that the present invention may be practiced without these specific details. In other instances, well-known steps such as those involved with encryption and decryption of data are not shown in order not to obscure the present invention.

Notation and Nomenclature

The detailed description with respect to the controlled dissemination of digital information is presented partially in terms of algorithm and symbolic representation upon operation on data bits within a computer memory. These algorithmic descriptions and representations are the means used by those skilled in the data processing art to convey most effectively the substance of their work to others skilled in the art.

An algorithm is here, and generally, conceived to be a self-consistent sequence of steps leading to a desired result. These steps require physical manipulation of physical quantities. Usually, though not necessarily, these quantities take the form of electrical, optical or magnetic signals capable of being stored, transferred, combined, and otherwise manipulated. It proves convenient at times, principally for reason of common usage, to refer to these signals as bits, values, elements, symbols, characters, numbers or the like. It should be borne in mind, however, that all of these and similar terms are to be associated with the appropriate physical quantities and are merely convenient labels applied to these quantities.

Further, the manipulations performed are often referred to in terms such as adding or comparing, which are commonly associated with the mental operations performed by a human operator. No such capability of a human operator is necessary, or desirable. In most cases, in any of the operations described herein which form part of the present invention, the operations are machine operations. Useful machines for performing the operations of the present invention include general purpose digital computers or similar devices. In all cases, it should be borne in mind that there is a distinction between the method operation in operating a computer or other apparatus and the method of computation itself. The present invention relates to method steps for providing better control over the dissemination of digital information.

The present invention also relates to an apparatus for performing these operations. This apparatus may be specially constructed for the required purpose or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct specialized apparatus such a dedicated processor to perform the required method steps. The required structure for a variety of these machines would appear from the description given below.

GENERAL SYSTEM CONFIGURATION

Figure 1:
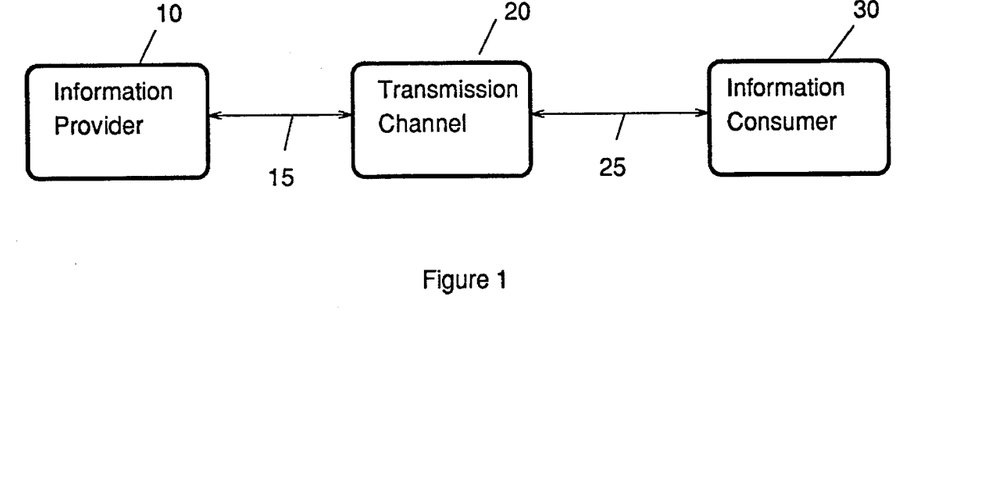
FIG. 1 is a model of information dissemination.

A general model of information dissemination is shown in FIG. 1. Here, the Information Provider 10 refers to a supplier of all types of information including but not restricted in form to text, graphics, animation, video, audio, software, or any combination thereof. The transmission channel 20 represents the means and more specifically the media through which information is delivered to the Information Consumer 30 over paths 15 and 25. The transmission channel 20 includes but is not limited to any communication means or media such as computer networks, satellite links, diskettes, optical disks or other storage medium. It should also be understood by one skilled in the art that Information Consumer 30 is used interchangeably with one or more end users of information. The present invention chooses the word "information consumer" to highlight the use-once nature of the controlled information. In other words, once controlled information is consumed, the original information no longer exists in a usable form and the re-access to the same information is not automatic. The use-once nature can be generalized to use-n-time, i.e., once the controlled information has been used for n times, it no longer exists in a usable form.

This invention teaches methods and apparatus for an information provider to prepare information packaging for dissemination. These methods are going to be described in specific steps of manipulating information. For one skilled in the art, it is obvious that some of these steps shall be best automated by, for example, implementing them as a special purpose software, which is normally called a server, running on general purpose computers. It is also clear that an information provider could simultaneously instantiate multiple executions of the server to serve multiple information consumers. For clarity of presentation, the description below shall elaborate on the model having one provider and one consumer in our description. It is also clear that an information consumer may also be another information provider.

FIRST EMBODIMENT OF THE PRESENT INVENTION

1. Preparation of distribution package

Figure 2:
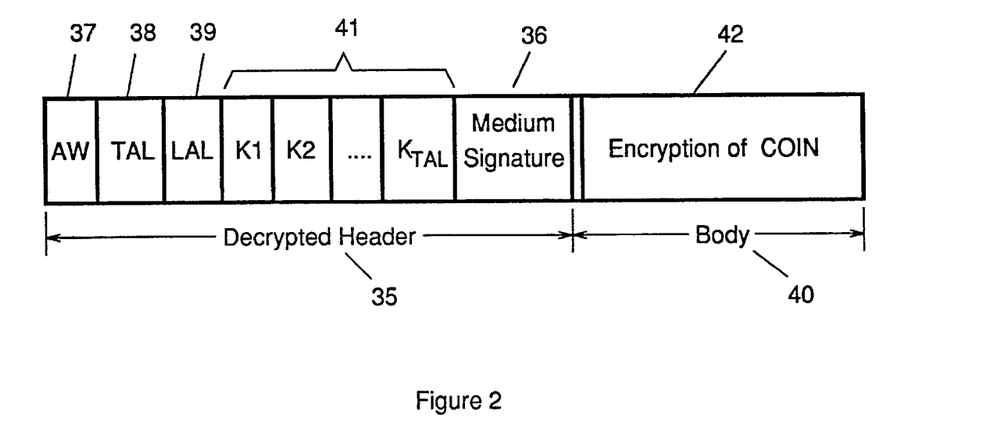
FIG. 2 illustrates a logical structure of a Sealed Controlled Information (COIN) according to a first embodiment of the present invention.

FIG. 2 illustrates a logical structure of a Sealed Controlled Information (COIN) according to a first embodiment of the present invention. The Sealed COIN is prepared by an information provider once the information consumer agrees to the terms of an information distribution contract. The first embodiment of the present invention describes an off-line scheme where the transmission channel 20 comprises any kind of non-volatile storage medium such as a floppy disk, a hard disk, an optical disk and other non-volatile semiconductor storage devices. An information distribution contract contains at a minimum the identity of controlled information, the number of accesses, and the type of transmission medium 20.

Referring again to FIG. 2, the logical structure of the Sealed Controlled Information (COIN) comprises a header 35 and a body 40. COIN refers to the original information encoded in some "soft" form (e.g., electronic, magnetic or optical) that the Information Provider 10 shall provide to the Information Consumer 30 for his access for a predetermined number of times. COIN is encoded or sealed by using some scheme such that accessing the COIN without a valid decryption key is computationally intractable. The header 35 further comprises a plurality of fields: a medium signature 36, an access window 37 (AW), total number of legal accesses allowed 38 (TAL), the number of legal accesses left 39 (LAL), and TAL number of encryption/decryption keys 41 ($K_1$ to $K_{TAL}$). The medium signature 36 refers to any scheme which allows a distribution medium, such as a floppy disk, to have a unique identification. Preferably, this signature depends upon the characteristics or nonuniformities of the distribution medium. For an example of a suitable medium signature, please refer to the pending U.S. application Ser. No. 08/120,969, filed 13 Sep. 1993, by the same assignee as the present invention, now U.S. Pat. No. 5,412,718. The AW 37 refers to a specified time period within which a legal access is granted to the information consumer for accessing the COIN. A start and end time is given as the boundary of the access window in which the Information Consumer 30 can access the disseminated information legally. TAL 38 is the total number of legal accesses to the COIN granted by the Information Provider 10 to the Information Consumer 30 under an information dissemination contract. LAL 39 is the number of legal accesses left; it is the difference between TAL and the number of accesses already granted. When LAL is equal to zero, access to COIN shall be denied. $K_1$ to $K_{TAL}$ 41 are keys used for decrypting the COIN in the body 40. Preferably the encryption and decryption scheme of $K_1$ to $K_{TAL}$ 41 is based on Public Key Cryptography (PKC) which allows the information provider to transmit secret messages to the access device without prior transmission of a secret key. Under PKC, each party has a pair of keys—one secret (known only to itself) and one public (known to everyone like a telephone number in a telephone directory). In other words, the information provider has a secret key (SSK) and a public key (SPK) while the access device has a secret key (DSK) and a public key (DPK). When the information provider sends a secret message to the information consumer, the information provider uses the access device's public key (DPK) to encrypt the message. Only the access device can decrypt the encrypted message by using its own secret key (DSK). For further reference on PKC, see R. L. Rivest, A. Shamir and L. Adleman: *"A Method for Obtaining Digital Signature in Public-Key Cryptosystems"* Communications of the ACM, Vol. 21, No. 2, February 1978, pp. 120–126. Also see D. E. R. Denning, *Cryptography and Data Security*, Addision-Wesley, Reading, Mass., 1983.

Figure 4:
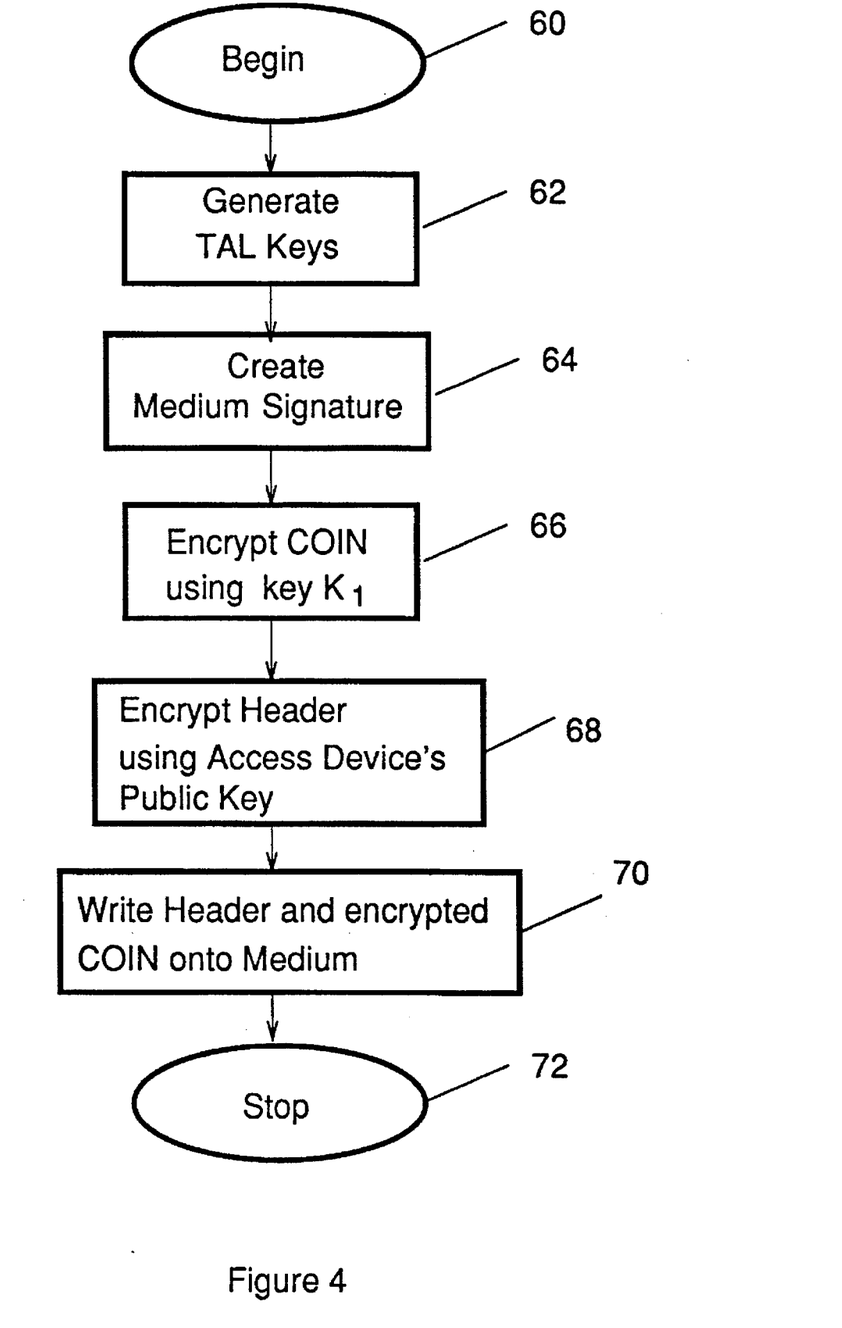
FIG. 4 illustrates the logical flow of how the Sealed COIN is prepared by an information provider.

Once the Information Consumer 30 agrees with the Information Provider 10 on the terms of the distribution contract, Information Provider 10 executes a procedure as outlined in FIG. 4 beginning with step 60 to produce a distribution medium incorporating the sealed COIN. In step 62 TAL number of keys, $K_1$ to $K_{TAL}$, are generated for encrypting COIN in the body 40. Although PKC is referred in the embodiment of the present invention, any method of encryption is applicable. Next, a medium signature 36 is created from the particular distribution medium on which COIN is to be distributed. Pending U.S. application Ser. No. 08/120, 969, filed 13 Sep., 1993, and assigned to the same assignee as the present invention exemplifies one of many ways of generating a medium signature. In step 66, COIN is encrypted with $K_1$. It follows that the body 40 of the sealed COIN is generated. In step 68, the header 35 is prepared next. Initially the value LAL 39 is set to be identical with that of TAL 38. By concatenating AW 37, TAL 38, LAL 39, $K_1$ to $K_{TAL}$ 41, and medium signature 36 as illustrated in FIG. 2, the header 35 is then encrypted in step 68 using the public key DPK of the information consumer's access device. The encrypted header 35 and the encrypted body 40 constitutes the sealed COIN and is written onto the distributed medium in step 70.

2. Access of information

Figure 3:
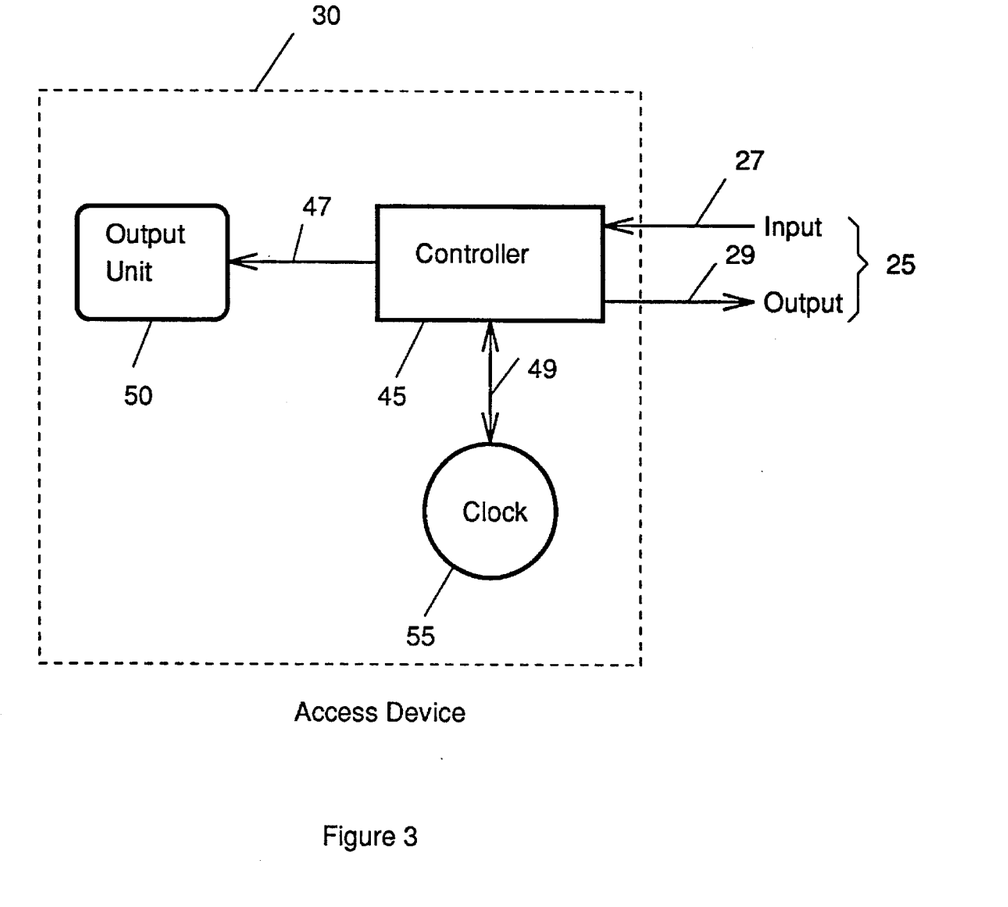
FIG. 3 shows the architecture of a device used by an information consumer for accessing the controlled information according to the first embodiment of the present invention.

It is assumed that the Information Consumer 30 has some device, for example a computer, to access the information in the distributed medium. The minimum enhancements to such a device for accessing COIN are shown in FIG. 3. A Controller 45 is coupled at its input to an information input channel 27 for receiving disseminated information from the read device (not shown) of distributed medium. The Controller 45 is also coupled at one of its outputs to an information output channel 29 for transmitting re-encrypted information to the write device (not shown) of the distributed medium. The function of Controller 45 shall be described below in the description of FIG. 5. It should be understood by one skilled in the art that the Controller 45 can be implemented fully in hardware or by a general purpose processor with the appropriate software. The controller 45 is also coupled at the other output to an output unit 50 over a link 47 for displaying the disseminated information. The output unit 50 could be a display unit for text/graphics/animation/video or a transducer for audio information. The output unit 50 could itself be a device for distributing controlled information to other information consumers. The controller 45 is also coupled to a clock 55 over link 49 for counter-checking whether the real time is within the boundary of the access window AW 37. Preferably, the clock 55 and the access device are tamper-proof such that the information consumer may not tap into the link 47 nor alter the value of the clock 55. It should be understood by one skilled in the art that the controller has means to interact with the user, the details of which are omitted in order not to obscure the description of the first embodiment of the present invention.

Figure 5A:
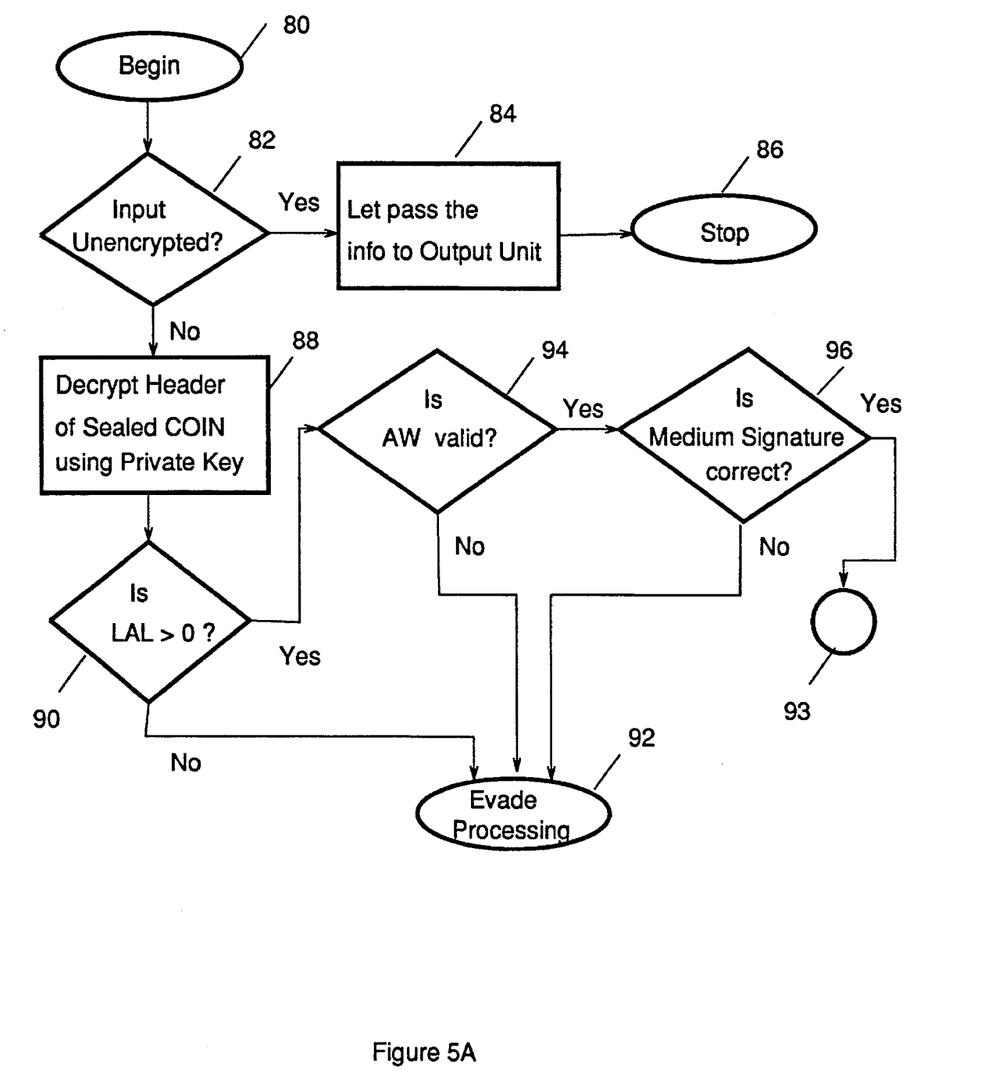
FIGS. 5A & 5B show the logical flow of the controller in the access device according to the first embodiment of the present invention.
Figure 5B:
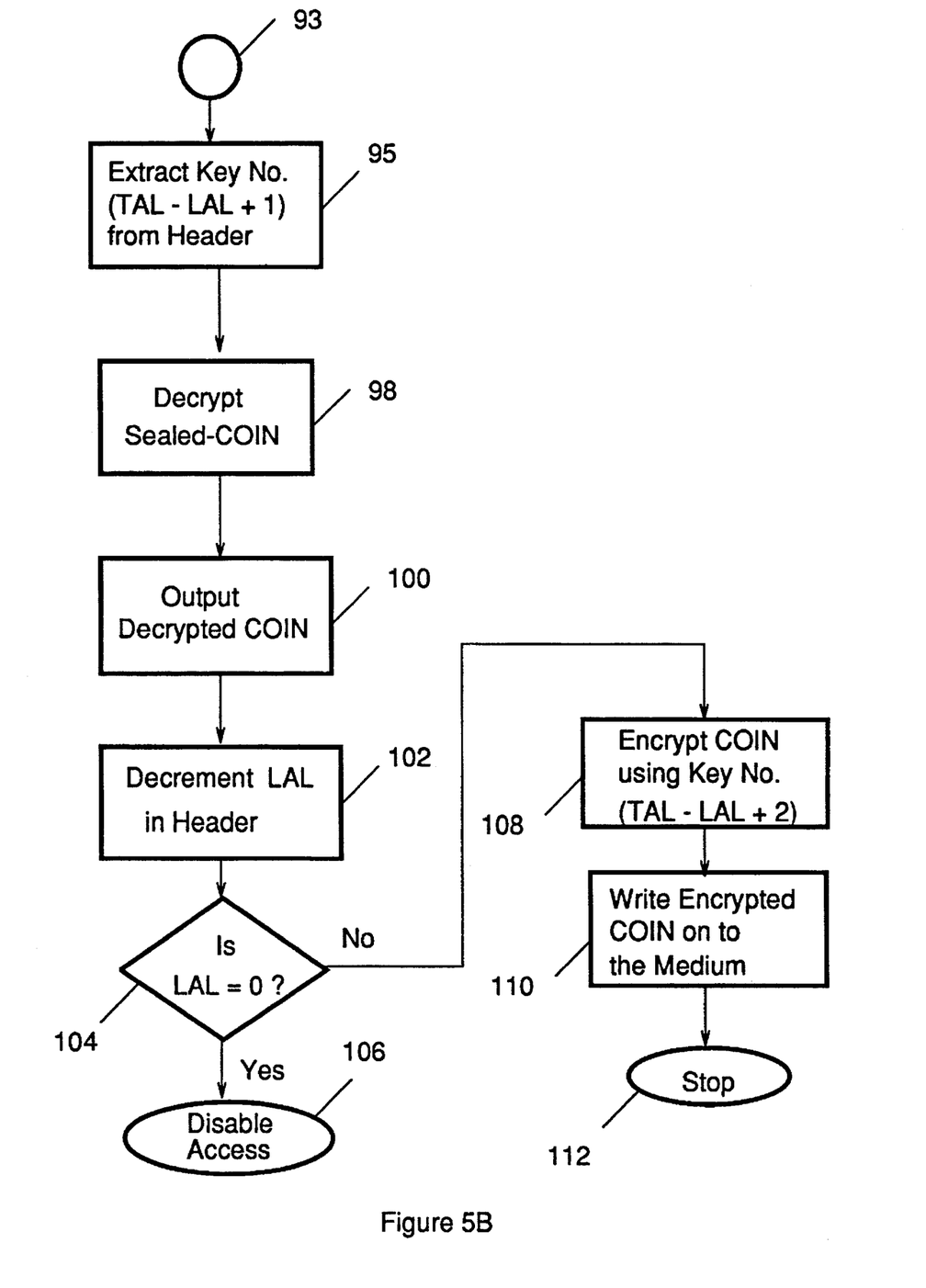

FIGS. 5A & 5B summarizes the logical flow of the Controller 45 of the access device in accordance to the first preferred embodiment of the present invention. When the Information Consumer 30 wishes to access the sealed COIN, he or she loads in step 80 the medium read/write device with the distribution medium (not shown) containing the sealed COIN. The Controller 45 of the access device is presented with the information read from the medium read/write device via the input channel 27. The Controller 45 checks in step 82 whether the information at the input channel 27 is encrypted. If the information is unencrypted, i.e., uncontrolled information, the Controller 45 allows the information at the input channel 27 to pass directly in step 84 to the output unit 50 over the link 47. However, if the information at the input channel 27 is encrypted or controlled, the Controller 45 decrypts the header 35 of the sealed COIN by using in step 88 the secret key DSK of the access device. As mentioned above, the secret key DSK is unknown to the Information Consumer 30. Next in step 90, the Controller 45 checks whether there are any legal access left by testing the value of LAL 38 for zero. If there are no legal accesses left, the value of LAL 38=0 and an evade processing module is invoked in step 92 which either denies the information access or erases the contents of the medium. The specific action depends on a particular embodiment of the invention. Should the value of LAL be greater than zero, then the Controller 45 compares in step 94 the value of the access window AW 37 with the time of the clock 55. If the current time falls outside of the boundary of the AW 37, the evade processing module in step 92 is invoked. Otherwise, the Controller 45 checks in step 96 whether the medium signature 36 corresponds with the signature read from the input channel 27 and that of the output channel 29. If the medium signature 36 does not match, the sealed COIN is stored on a copied medium. An evade processing module as in step 92 is invoked. Otherwise, the Controller 45 confirms that the Information Consumer 30 has a right to access the sealed COIN on the distribution medium.

It should be obvious to those skilled in the art that the controller of the access device of the present invention permits the information consumer to access transparently uncontrolled and controlled information in an off-line manner by using the same access device. While the present invention obviates the task of switching back and forth between at least two access devices, it also allows the information provider to distribute uncontrolled and controlled information in one package. With greater information at the disposal of the information consumer, usage of controlled information under the terms of the information provider is encouraged.

After the Controller 45 determines that the Information Consumer 30 has a right to access the sealed COIN on the distribution medium in FIG. 5A, the controller extracts in step 95 the encryption/decryption key $K_{TAL-LAL+1}$ from the header 35. The Controller 45 disables dumping of decrypted information via the output channel 29. The Controller 45 then decrypts the sealed COIN by using the key $K_{TAL-LAL+1}$ in step 98. The decrypted information, COIN, is provided in step 100 in FIG. 5B as output to the output unit 50 over the link 47. It follows that the Information Consumer 30 accesses the COIN transparently while the Controller 45 checks, validates, encrypts and decrypts the appropriate controlled information automatically. In step 102 the Controller 45 decrements the value of the LAL by one. The header 35 thus become modified header 35'. Should the value of LAL equals zero as tested in step 104, then a "disable information access" module is invoked in step 106 which for example, erases the sealed COIN from the distribution medium. If the value of LAL is >0, then the Controller 45 extracts the encryption/decryption key $K_{TAL-LAL+2}$ and encrypts the COIN in step 108. The Controller 45 then encrypts the modified header 35' by using the public key DPK of the access device. Finally the Controller 45 writes the new sealed COIN generated by this encrypted COIN 40 and the encryption of the modified header 35' onto the distribution medium via output channel 29 in step 110. Thus, the procedure described in FIGS. 5A and 5B implements a "use-n-times" controlled information scheme that give the information provider enhanced control over the dissemination of digital information.

SECOND EMBODIMENT OF THE PRESENT INVENTION

1. Overall system set-up and operations

The second embodiment of the present invention describes an online scheme for controlled dissemination of digital information. Referring once again to FIG. 1, the transmission channel 20 comprises a variety of communication links between the Information Provider 10 and the Information Consumer 30. For instance, the transmission channel 20 could include a computer network or even telephone lines.

Figure 6:
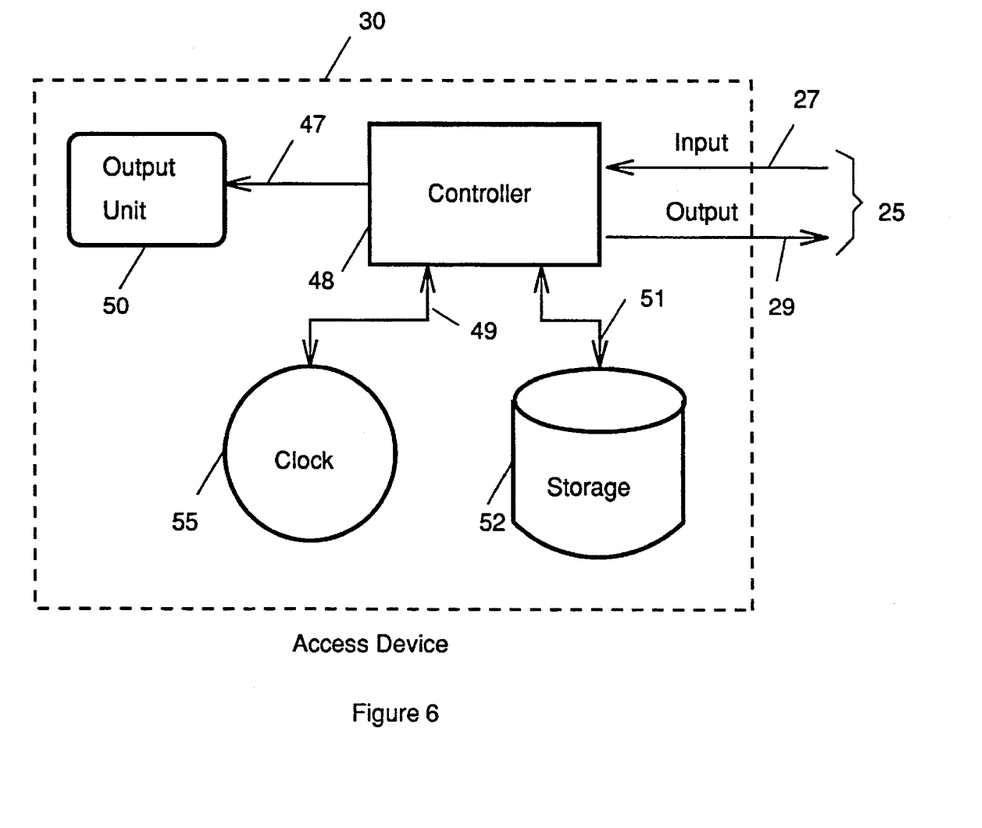
FIG. 6 illustrates the architecture of an access device for a system for controlled dissemination of digital information according to the second embodiment of the present invention.

The architecture of an access device modeling the Information Consumer 30 for an on-line scheme is illustrated in FIG. 6. Controlled information from the transmission channel 20 is presented to the Information Consumer 30 over an input channel 27 which is coupled to a Controller 48. The functions of the Controller 48 shall be elaborated in connection with the description of FIG. 11. The Controller 48 can be implemented either in hardware or by a general purpose processor with proper software. Referring again to FIG. 6, the Controller 48 is coupled to an output unit 50 over a clear channel 47. Just as in the first embodiment of the present invention, the output unit 50 comprises a device for outputting controlled information or a mechanism for distributing controlled information to others. The Controller 48 is also coupled to a memory storage 52 and a clock 55 for reasons which shall be explained below. The Controller 48 is coupled to an output channel 29 for outputting re-encrypted controlled information. Preferably, the various channels coupled to the Controllers 48 are tamper-proof. This will make it impossible for users to tap into the clear channel 47, to access the Controller 48, to alter the value of the memory storage 52, or to change the value of the clock 55. It should be understood by one skilled in the art that the controller has means to interact with the user, the details of which are omitted in order not to obscure the description of the second embodiment of the present invention.

The objective of the on-line scheme of controlled dissemination of digital information is to achieve improved control of the delivery of information so that once the information is accessed by the information consumer for a specified number of times, the information no longer exists in a usable form without authorization from the information provider. The enhanced control of information dissemination is achieved by using encryption and by limiting an information consumer's access at a designated legal access device during an access window.

Figure 7A:
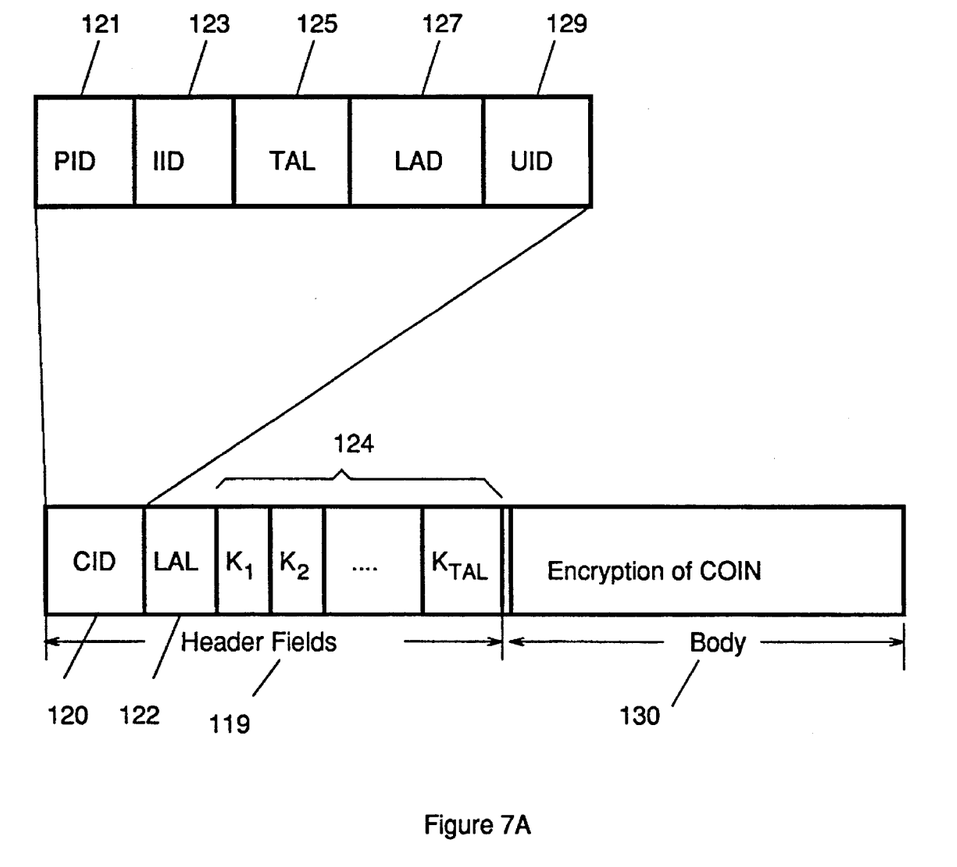
FIG. 7A illustrates a possible format of the logical structure of Sealed COIN used in a second embodiment of the present invention.
Figure 7B:
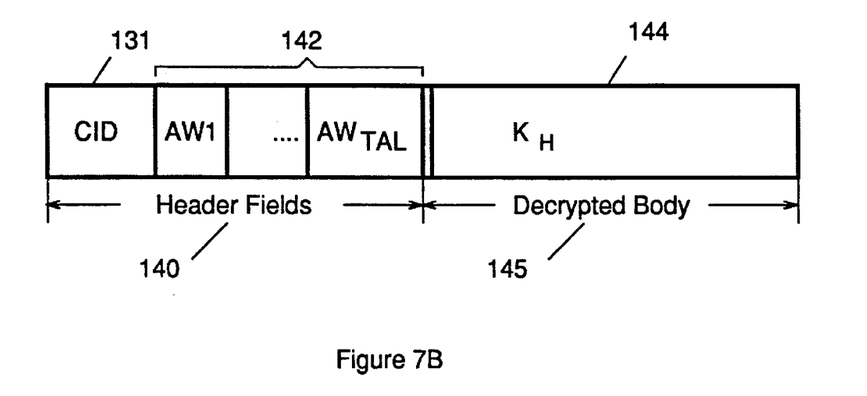
FIG. 7B illustrates a possible format of the logical structure of the Sealed Opener which cooperates with the Sealed COIN used in the second embodiment of the present invention.

In order to achieve the above mentioned controls, the encrypted COIN is packaged with some control data, which is called the "header" while the encrypted COIN is called the "body". The header and body together are called the Sealed-COIN. A user presents the Sealed-COIN together with a ticket to the access device in order to access the COIN. This ticket is called "Seal Opener" or just "Opener" for short. The Openers are issued by the Information Provider at user's request. FIGS. 7A and 7B illustrate possible logical structures of Sealed-COIN and Seal Opener for realizing the second embodiment of the present invention. Below are definitions of specific terms and acronyms needed in the rest of the description:

COIN Original information encoded in some digital form; identified by unique identification, IID.

TAL Total number of legal access to the COIN allowed by the information provider to information consumer.

LAL Number of legal access left.

LAD The device on which the COIN can be accessed legally.

PID Unique identification number of information provider.

UID Unique identification number of information consumer.

CID Unique identification of a contract of information dissemination. Logically, a contract associates PID, IID, TAL, LAD and UID.

AW Access window is the time during which a legal access is granted to COIN.

An agreement or contract of information dissemination (CID) between an information provider and an information consumer provides at a minimum that the information provider shall provide some COIN to the information consumer for TAL number of legal accesses on certain LAD. As such, CID associates with PID, IID, TAL, LAD and UID respectively. In the simplest form, a CID is formed by concatenating PID, IID, TAL, LAD and UID as illustrated logically in FIG. 7A. It should be understood by one skilled in the art that although the fields 121 to 129 in FIG. 7A are drawn in some order, the structure of CID 120 in any implementation is not bound by this order and arrangement. Similarly, the generality of the preceding comments applies to FIG. 7B. CID 120 expires when all of TAL 125 number of accesses have been made.

Referring again to FIG. 7A, a Sealed-COIN comprises a header 119 and a body 130. As mentioned above briefly, body 30 is the original COIN which has been encoded by using some encryption scheme so that obtaining the COIN without a valid decryption key is computationally intractable. The decrypted header 119 further comprises three fields: CID 120, LAL 122 and keys 124. Keys 124 consist of TAL number of keys $K_1, K_2, \ldots, K_{TAL}$. They are used to decrypt the body and further encrypt the COIN to form new Sealed-COIN.

FIG. 7B shows the logical structure of a Seal Opener. It too has a header 140 and a body 145. The header 140 has two fields: CID 131 and AW 142. CID 131 of the Opener is identical to the CID 120 of the Sealed-COIN. The AW 142 holds a number of access windows during which the information consumer may access the COIN. The body 145 contains a decryption key $K_H$ for the header 119 of the Sealed-COIN in FIG. 7A. The key $K_H$ is maintained for the life of contract CID. For the second embodiment of the present invention, a Public Key Cryptography scheme as well as a conventional secret key scheme are used to illustrate the on-line scheme of information dissemination. With respect to a Public Key scheme, the present invention denotes the secret and public keys of Information Provider 10 by PSK and PPK, respectively, and the secret and public keys of the access device by DSK and DPK, respectively.

Figure 8:
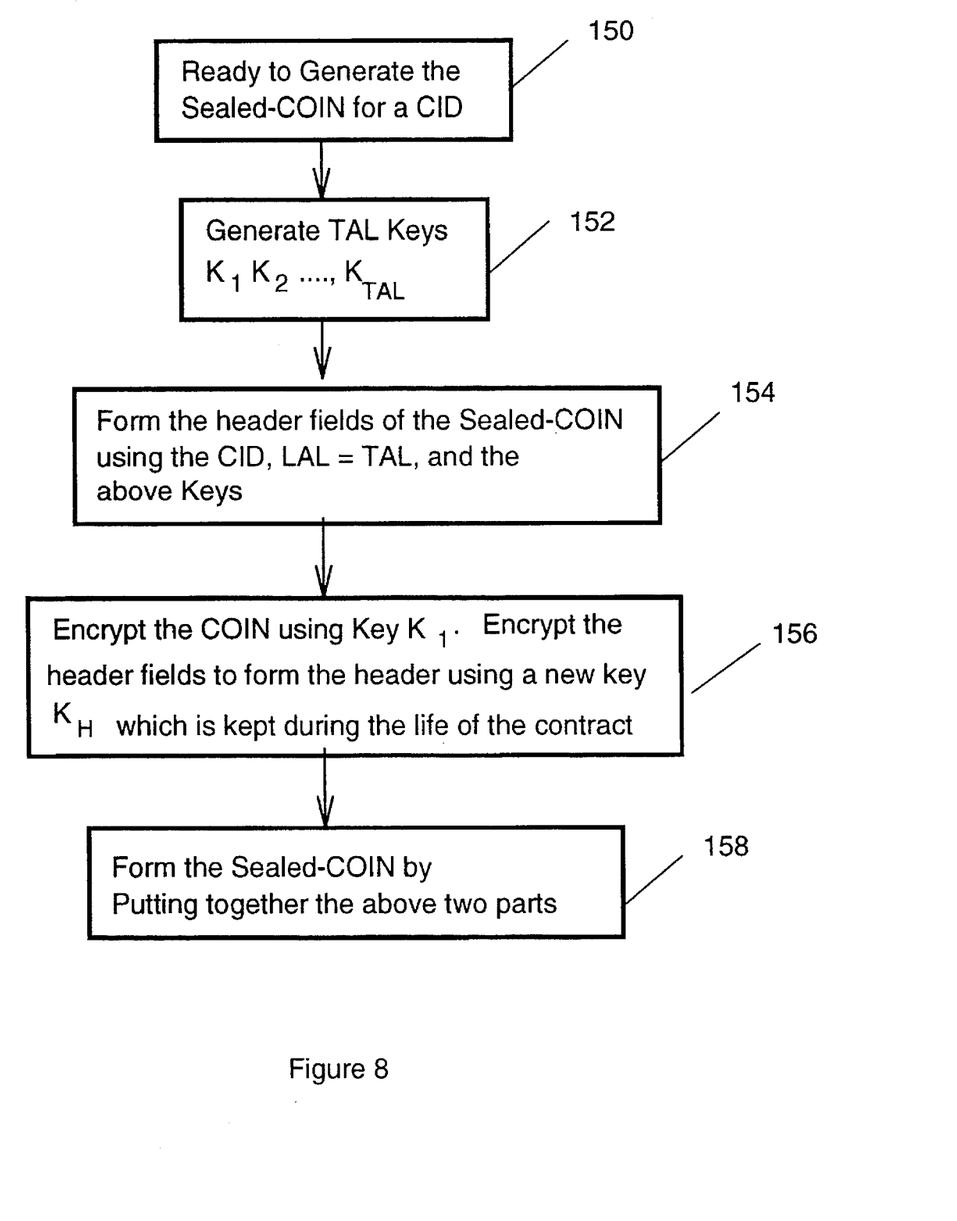
FIG. 8 illustrates the flow diagram of the information provider used in the second embodiment of the present invention where a Sealed COIN is generated.
Figure 9:
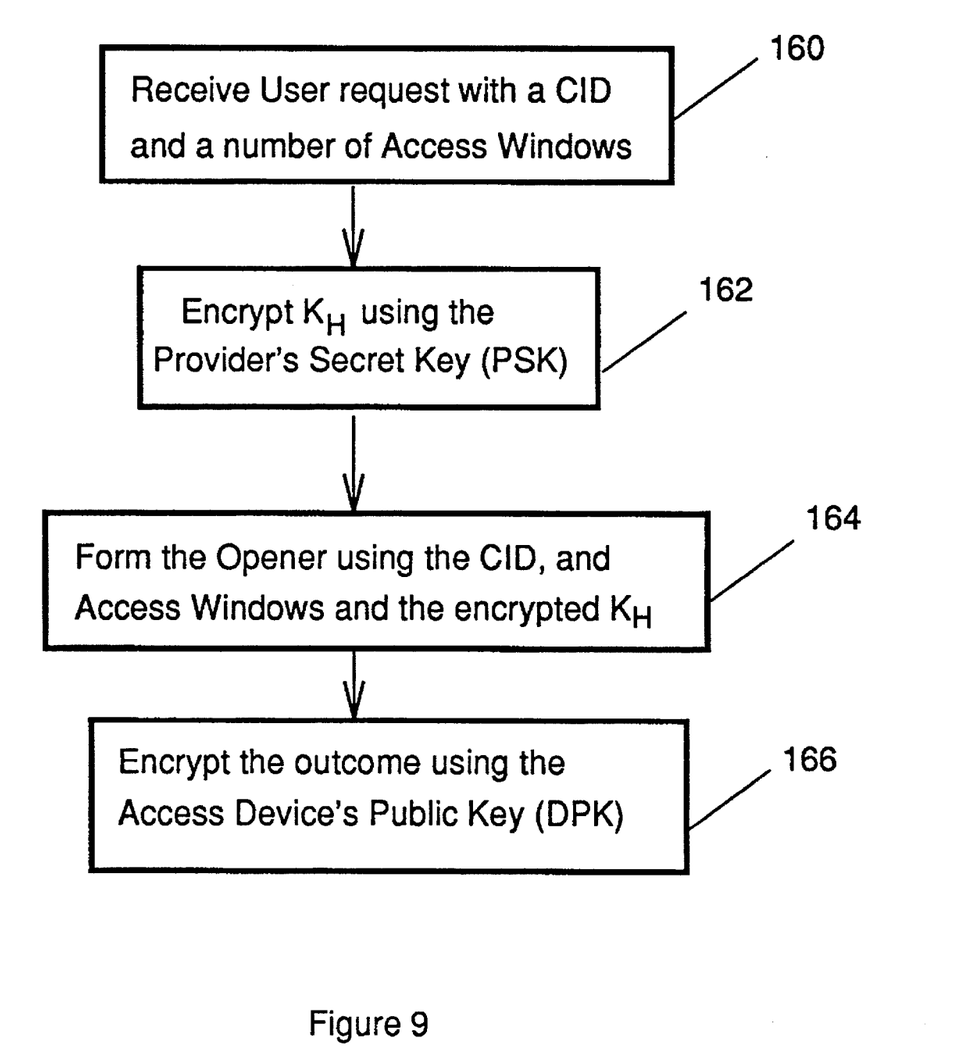
FIG. 9 shows the flow diagram of the information provider used in the second embodiment of the present invention where an opener for accessing the sealed COIN in FIG. 8 is generated.
Figure 10:
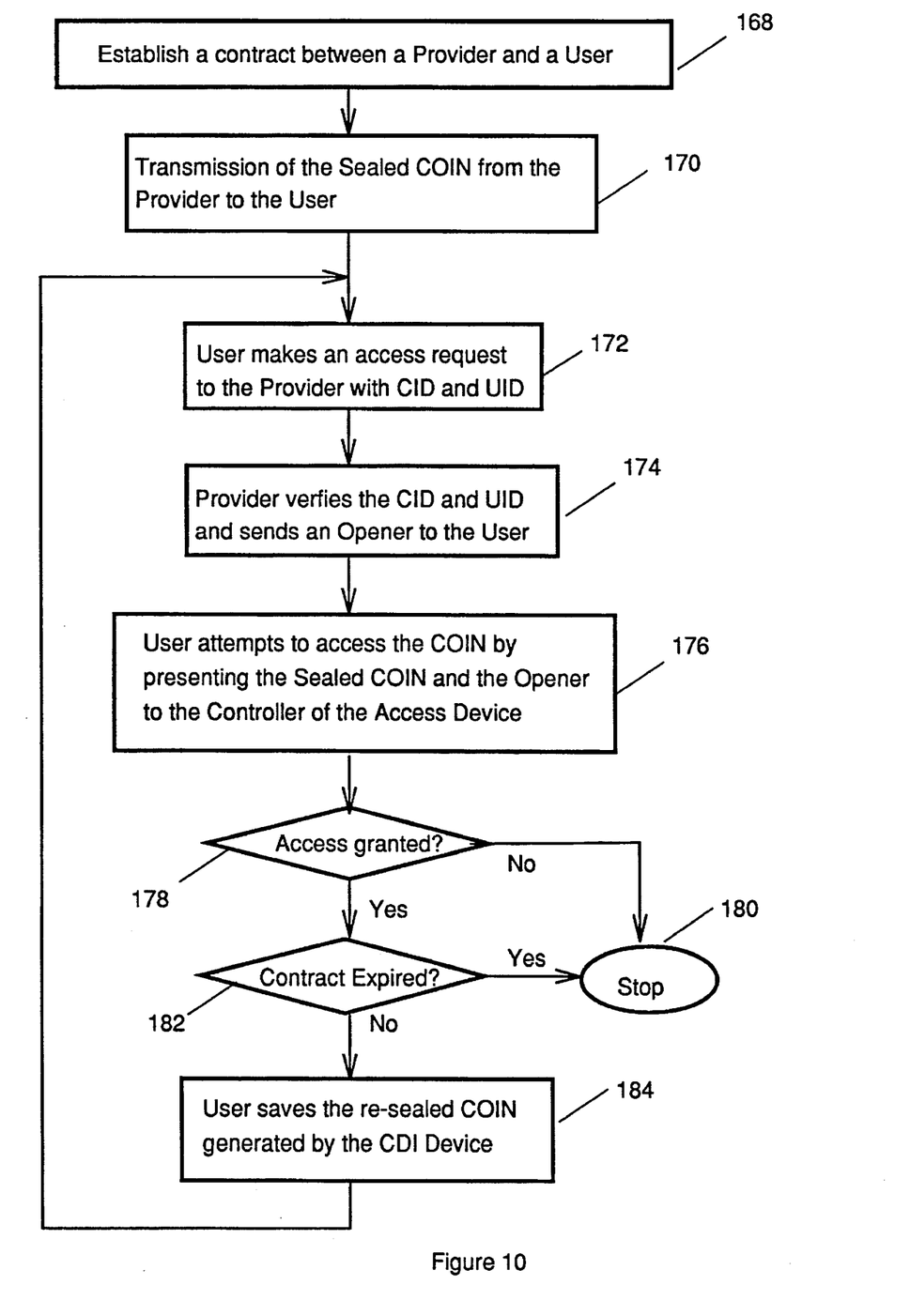
FIG. 10 illustrates the logical flow of the overall process of on-line controlled dissemination of information according to the second embodiment of the present invention.

FIG. 10 illustrates the logical flow of the overall process of on-line controlled dissemination of information of the present invention. The on-line scheme of the present invention commences with the establishment of a contract between an Information Provider 10 and an Information Consumer 30 in step 168 of FIG. 10. At this juncture, a CID and its associated fields PID 121, IID 123, TAL 125, LAD 127 and UID 129 are stipulated in the contract. Based on this information, the Information Provider 10 generates a Sealed-COIN as illustrated in FIG. 8, and transmits it over the transmission channel 20 to the information consumer in step 170 of FIG. 10. The information consumer then makes an request to the Information Provider 10 over the same channel in step 172 of FIG. 10. After verifying the information consumer's request in step 174 of FIG. 10, the Information Provider 10 generates an Opener as outlined in steps 160–166 of FIG. 9 and transmits the Opener to the information consumer in step 174 of FIG. 10. The information consumer presents the Sealed-COIN received earlier and the Opener to Controller 48 for accessing the COIN in step 176.

In determining whether to grant the information consumer's request for access in step 178, the Controller 48 applies the logical sequence of steps as outlined in FIGS. 11A and 11B details of which shall be elaborated below. Should an access be granted, the Controller 48 checks if the CID contract has expired in step 182 of FIG. 10, i.e., whether all the TAL number of accesses have been made by the information consumer. If not, the COIN is re-sealed as described below and the outcome is made available to the information consumer through the Information Output Channel 29. The information consumer saves the re-sealed COIN for future access in step 184. For subsequent accesses, the information consumer starts from step 172 by making another access request to the Information Provider 10. This continues until the expiration of the contract as in step 180.

2. Preparation of Sealed-COIN and Seal Opener

FIG. 8 describes how an information provider generates a Sealed-COIN. The information provider is ready to generate a Sealed-COIN in step 150 if it has the CID and the values of the associated quantities, namely, PID, IID, TAL, LAD and UID. The information provider first generates TAL number of keys, $K_1, K_2, \ldots, K_{TAL}$ in step 152. Next, in step 154, the information provider forms the header fields 119 of the Sealed-COIN by combining the CID for field 120, the value of TAL for field 122 and the keys for field 124. Then the body 130 of the Sealed-COIN is formed by encrypting the COIN identified by IID with key $K_1$. The header fields 119 in turn are encrypted in step 156 to form the header with a new key $K_H$ which the information provider maintains in association with the contract CID during the life time of the contract. As mentioned earlier, the key $K_H$ forms part of the body of the Opener. Finally, the information provider forms the Sealed-COIN by concatenating the header and the body in step 158.

FIG. 9 illustrates in detail the steps in which the information provider generates an Opener. The process starts with an information consumer making an access request with a valid CID and a number of valid access windows AW in step 160. With the CID, the information provider finds the corresponding key $K_H$, which it used in step 156 to encrypt the header fields 119 of the Sealed-COIN, and encrypts $K_H$ using the information provider's secret key PSK in step 162. The information provider then forms the Opener by using the CID for field 131, AWs for field 142 and the above encrypted $K_H$ for field 144 in step 164. Finally, the Opener is generated by encrypting the above outcome with the access device's public key DPK in step 166.

3. Access to Sealed-COIN

Figure 11A:
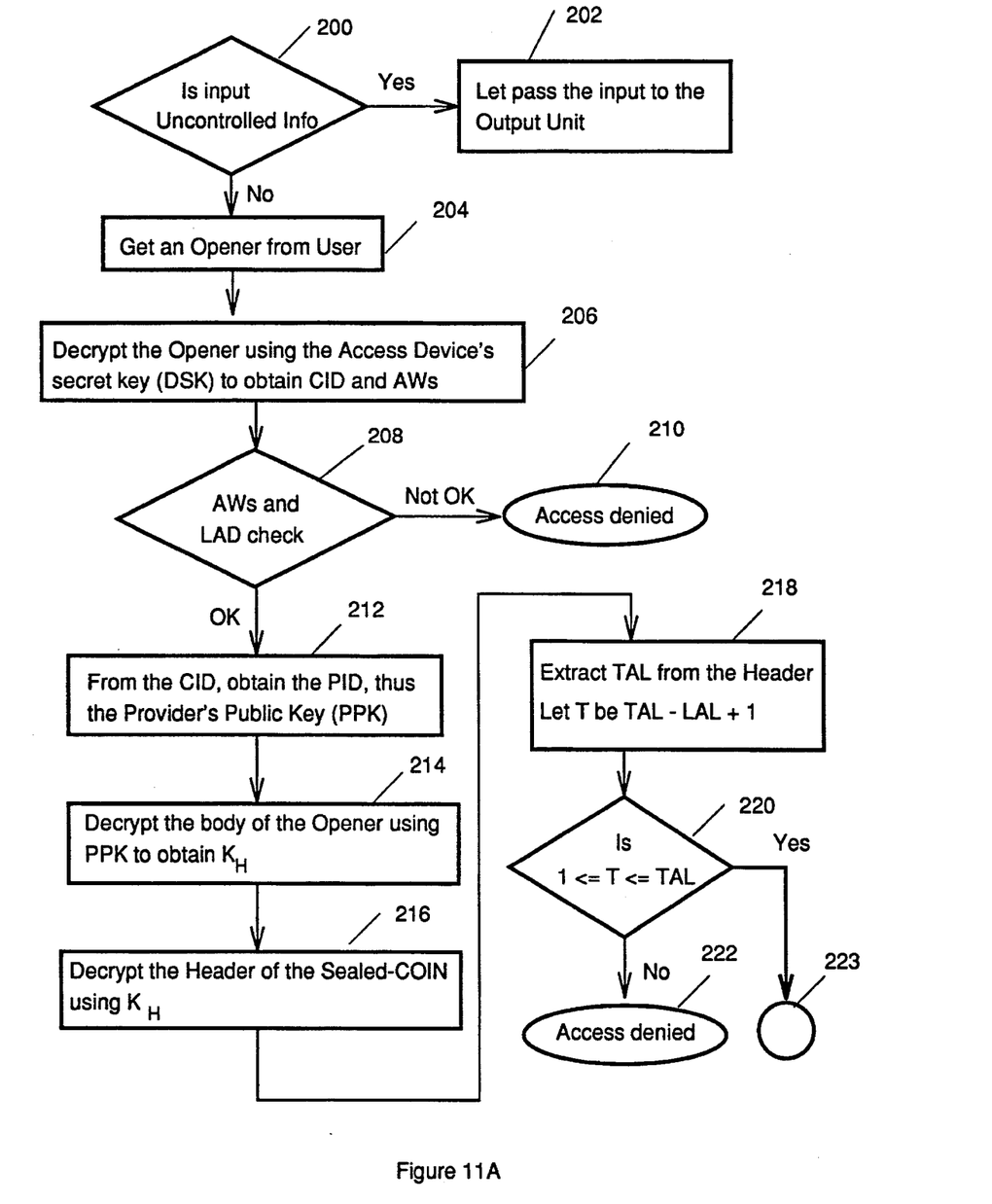
FIGS. 11A and B illustrate the flow diagram of the controller in the access device according to the second embodiment of the present invention.
Figure 11B:
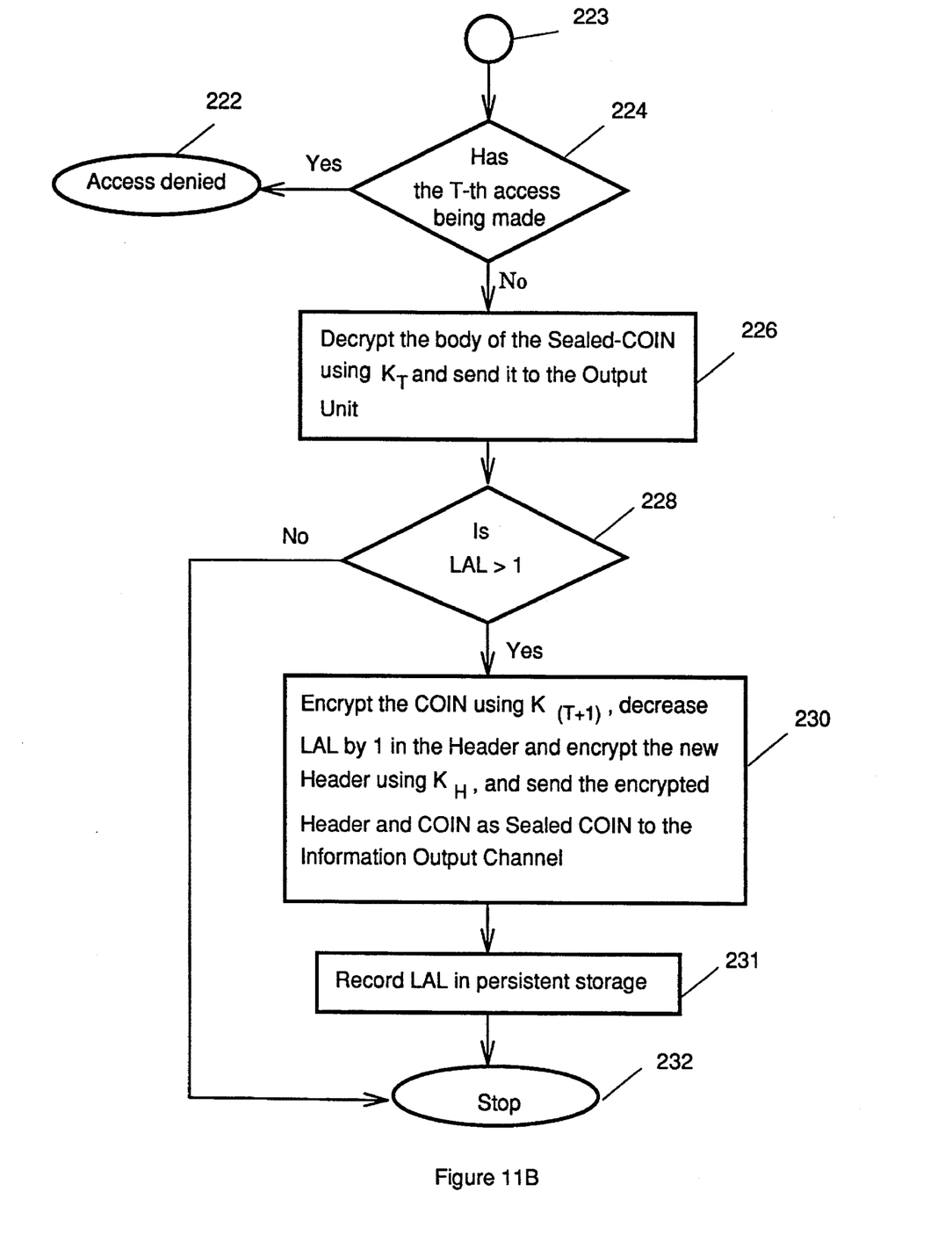

As mentioned briefly above, FIGS. 11A and 11B describes the controller's logical steps in determining whether to grant the information consumer its access request. Step 200 checks whether the input is uncontrolled information. An example of uncontrolled information is catalog information for the user to browse. If it is uncontrolled information, it is outputted to the output unit 50 over the clear channel 47. Otherwise, the Controller 48 asks the information consumer for an Opener in step 204. The controller uses its own (i.e., the Access Device's) secret key DSK to decrypt the Opener to extract CID and AWs from field 131 and field 142 in step 206. From the CID, the controller extracts the LAD from field 127. The controller checks whether the LAD matches with its own (i.e., the Access Device's) identification, and verifies whether the current time according to Clock 55 is within one of the AWs found in field 142. If any of these checks fails, access to controlled information is denied in step 210.

If the checks in step 208 are successful, the controller extracts the PID from field 121, and thus the information provider's public key PPK in step 212. With this key, the controller decrypts the body 145 of the Opener to obtain $K_H$ in step 214. Using $K_H$, the controller then, in step 216, decrypts the header 119 of the Sealed-COIN presented earlier by the information consumer. Then it extracts the value of TAL from field 125 of the header in step 218. The controller then checks in step 220 whether T (denoting the value of TAL–LAL+1) is within the range of [1, TAL]. In step 222, the access is denied if T is not within the range. When T is within the range, the controller then checks whether T-th access has been made in step 224 in FIG. 11B. It is important to note that the T-th access is recorded in the memory storage 52 in step 231. The second and subsequent attempts for the T-th access will be denied in step 222. If the T-th access has not been made, the controller then decrypts the body 130 of the Sealed-COIN using Key $K_T$ found in the header field 124. The controller sends the outcome to the Output Unit 50 via clear channel 47 in step 226. In the case where LAL is greater than 1, the controller proceeds to step 230. Here, the controller re-encrypts the COIN using key $K_{T+1}$ found in field 124 of header 119. Next, the controller decrements the value in field 122 of the header 119 by one and encrypts the new header using key $K_H$. The header 119 thus becomes modified header 119'. The modified header 119' and COIN are concatenated to form a new Sealed-COIN which is directed to Information Output Channel 29 for the information to save. Finally, in step 231 the current value of LAL is recorded in the storage 52 for the check in step 224 whether the T-th access has been made. The process terminates in step 232.

While the present invention has been described particularly with reference to FIGS. 1 to 11B with emphasis on a method for controlling the dissemination of digital information in either an off-line or an on-line environment, it should be understood that the figures are for illustration only and should not be taken as limitations on the invention. In addition, it is clear that the methods of the present invention have utility in many applications where control of dissemination of digital information is required. It is contemplated that many changes and modifications may be made by one of ordinary skill in the art without departing from the spirit and the scope of the invention as described.

We claim:

1. In a system for controlling the dissemination of information by an information provider in an off-line manner including at least a storage medium and at least an access device at an information consumer's disposal, said information including both controlled information COIN and uncontrolled information, a method for providing enhanced control over the usage of controlled information comprising the steps of:

a. encrypting said COIN and a header to produce a Sealed-COIN on said storage medium, said header further comprising at least a total number of legal accesses, number of legal accesses left, a plurality of encryption/decryption keys, and a medium signature for checking and validating the authenticity of said storage medium;

b. decrypting said header of said Sealed-COIN and checking the values in said header with a controller disposed in said access device upon access of said storage medium by an information consumer; said controller disallowing access to information if any of the checking in (a) and (b) fails;

c. decrypting said Sealed-COIN and presenting said information therein to an output unit disposed in said access device if all the checking in (a) and (b) with said controller succeeds, said header being modified to become modified header in accordance to the agreement between the information provider and the information consumer; and d. re-encrypting said COIN and said modified header after each access request by said information consumer until there is no legal access left, whereby said information provider exercises control of access by setting values for said header and the information consumer transparently accessing controlled and uncontrolled information.

2. The method as defined in claim 1, wherein said information comprises any digital information.

3. The method as defined in claim 1, wherein said controller permits a predetermined number of accesses to said information upon checking the value of said number of legal accesses left.

4. The method as defined in claim 1, wherein said header further comprises a plurality of access windows, the value of each said access window being checked by said controller to permit access to said information during a predetermined period of time.

5. The method as defined in claim 1 wherein said header further comprises legal access device identification information, the value of said legal access identification being checked by said controller to permit access only on said legal access device.

6. The method as defined in claim 1, wherein said medium signature permits access to said information on said access device only if said controller matches the medium signature of said storage medium with the medium signature read by said access device.

7. The method as defined in claim 1, wherein said controller is coupled to said output unit over tamper-proof links.

8. In a system for controlling the dissemination of information by an information provider in an on-line manner over at least one transmission channel and at least one access device at an information consumer's disposal, said information including both controlled information COIN and uncontrolled information, a method for providing enhanced control over the usage of controlled information comprising the step of:

a. encrypting said COIN and a header to produce a Sealed-COIN before sending said Sealed-COIN to said information consumer, said header further comprising at least a total number of legal accesses, number of legal accesses left, a plurality of encryption/decryption keys for encrypting said information, said header being encrypted by an encryption/decryption key $K_H$ maintained for the life of a predetermined distribution contract;

b. encrypting a Seal Opener upon receiving access request from an information consumer and sending said Seal Opener to the information consumer, said Seal Opener comprising at least a plurality of access windows, and said key $K_H$;

c. decrypting said Seal Opener with a controller disposed in said access device, said controller checking the value in said Sealed Opener upon access by the information consumer, said controller disallowing access to said information if any of the checks in (a) and (b) fails;

d. decrypting said Sealed-COIN and presenting said information therein to an output unit disposed in said access device if all the checks in (a) and (b) with said controller succeeds, said header being modified to become modified header; and e. re-encrypting said COIN and said modified header after each access request by said information consumer until there is no legal access left, whereby said information provider exercises control of access by setting values for said header in accordance to the agreement between the information provider and the information consumer and the information consumer transparently accessing controlled and uncontrolled information.

9. The system as defined in claim 8, wherein said information comprises any digital information.

10. The method as defined in claim 8, wherein said controller permits a predetermined number of accesses to said information upon checking the value of said total number of legal accesses left.

11. The method as defined in claim 8, wherein said header further comprises legal access device identification information, the value of said legal access identification being checked by said controller to permit access only on said legal access device.

12. The method as defined in claim 8, wherein the value of said access window of said Seal Opener is being checked by said controller to permit access to said information during a predetermined period of time.

13. The method as defined in claim 8, wherein said controller is coupled to said output unit over tamper-proof links.

* * * * *